United States Patent
Li et al.

(10) Patent No.: US 8,160,866 B2
(45) Date of Patent: Apr. 17, 2012

(54) SPEECH RECOGNITION METHOD FOR BOTH ENGLISH AND CHINESE

(76) Inventors: Tze Fen Li, Taichung (TW); Tai-Jan Lee Li, Taichung (TW); Shih-Tzung Li, Taichung (TW); Shih-Hon Li, Taichung (TW); Li-Chuan Liao, Taichung (TW)

( * ) Notice: Subject to any disclaimer, the term of this patent is extended or adjusted under 35 U.S.C. 154(b) by 859 days.

(21) Appl. No.: 12/248,924

(22) Filed: Oct. 10, 2008

(65) Prior Publication Data

US 2009/0265159 A1    Oct. 22, 2009

Related U.S. Application Data

(63) Continuation-in-part of application No. 12/081,669, filed on Apr. 18, 2008, now abandoned.

(51) Int. Cl.
G06F 17/20 (2006.01)

(52) U.S. Cl. ............... 704/8; 704/2; 704/224; 704/233; 704/236; 704/239; 704/254; 704/257; 715/716; 715/728

(58) Field of Classification Search ............. 704/2, 233, 704/239, 224, 257, 236, 254; 715/716, 728
See application file for complete search history.

(56) References Cited

U.S. PATENT DOCUMENTS

| | | | |
|---|---|---|---|
| 4,905,287 A * | 2/1990 | Segawa | 704/254 |
| 4,933,973 A * | 6/1990 | Porter | 704/233 |
| 4,991,216 A * | 2/1991 | Fujii et al. | 704/254 |
| 5,596,679 A * | 1/1997 | Wang | 704/236 |
| 5,893,058 A * | 4/1999 | Kosaka | 704/254 |
| 6,304,844 B1* | 10/2001 | Pan et al. | 704/257 |
| 7,058,889 B2* | 6/2006 | Trovato et al. | 715/716 |
| 7,478,033 B2* | 1/2009 | Wu et al. | 704/2 |
| 7,542,893 B2* | 6/2009 | Cancedda et al. | 704/2 |
| 2002/0163533 A1* | 11/2002 | Trovato et al. | 345/728 |
| 2004/0236573 A1* | 11/2004 | Sapeluk | 704/224 |
| 2008/0133234 A1* | 6/2008 | Ding | 704/239 |
| 2011/0202340 A1* | 8/2011 | Ariyaeeinia et al. | 704/233 |

* cited by examiner

Primary Examiner — Michael Colucci (57) ABSTRACT

The present invention can recognize both English and Chinese at the same time. The most important skill is that the features of all English words (without samples) are entirely extracted from the features of Chinese syllables. The invention normalizes the signal waveforms of variable lengths for English words (Chinese syllables) such that the same words (syllables) can have the same features at the same time position. Hence the Bayesian classifier can recognize both the fast and slow utterance of sentences. The invention can improve the feature such that the speech recognition of the unknown English (Chinese) is guaranteed to be correct. Furthermore, since the invention can create the features of English words from the features of Chinese syllables, it can also create the features of other languages from the features of Chinese syllables and hence it can also recognize other languages, such as German, French, Japanese, Korean, Russian, etc.

11 Claims, 4 Drawing Sheets

SPEECH RECOGNITION METHOD FOR BOTH ENGLISH AND CHINESE

RELATED APPLICATION

This application is a Continuation-In-Part application of Ser. No. 12/081,669, filed Apr. 18, 2008 now abandoned, and entitled "A SPEECH RECOGNITION METHOD FOR MONOSYLLABLES AND SENTENCES WITH 100% RECOGNITION RATE".

BACKGROUND OF THE INVENTION

1. Field of the Invention

This invention is a method for speech recognition on both English and Chinese. The method includes a fixed number of elastic frames of equal length without filter and without overlap to normalize the waveform of a Chinese syllable or English word to produce an equal-sized matrix of linear predict coding cepstra (LPCC), a Bayesian pattern matching method to select a known English word or Chinese syllable for the input unknown English word or Chinese syllable, a segmentation method for an unknown sentence or name to be partitioned into a set of D unknown English words or Chinese syllables and a screening method to select an English or Chinese sentence or name from an English and Chinese sentence and name database.

2. Description of the Prior Art

In the recent years, many speech recognition devices with limited capabilities are now available commercially. These devices are usually able to deal only with a small number of acoustically distinct English words or Chinese syllables. The ability to converse freely with a machine still represents the most challenging topic in speech recognition research. The difficulties involved in speech recognition are:

(1) to extract linguistic information from an acoustic signal and discard extra linguistic information such as the identity of the speaker, his or her physiological and psychological states, and the acoustic environment (noise), (2) to normalize an utterance which is characterized by a sequence of feature vectors that is considered to be a time-varying, nonlinear response system, especially for an English words which consist of a variable number of syllables, (3) to meet real-time requirement since prevailing recognition techniques need an extreme amount of computation, and (4) to find a simple model to represent a speech waveform since the duration of waveform changes every time with nonlinear expansion and contraction and since the durations of the whole sequence of feature vectors and durations of stable parts are different every time, even if the same speaker utters the same words or syllables.

These tasks are quite complex and would generally take considerable amount of computing time to accomplish. Since for an automatic speech recognition system to be practically useful, these tasks must be performed in a real time basis. The requirement of extra computer processing time may often limit the development of a real-time computerized speech recognition system.

A speech recognition system basically contains extraction of a sequence of feature for an English word or Chinese syllable, normalization of the sequence of features such that the same English words or Chinese syllables have their same feature at the same time position and different English words or Chinese syllables have their different own features at the same time position, segmentation of an unknown English (Chinese) sentence or name into a set of D unknown English words (Chinese syllables) and selection of a known English (Chinese) sentence or name from a database to be the unknown one.

The measurements made on speech waveform include energy, zero crossings, extrema count, formants, linear predict coding cepstra (LPCC) and Mel frequency cepstrum coefficient (MFCC). The LPCC and the MFCC are most commonly used in most of speech recognition systems. The sampled speech waveform can be linearly predicted from the past samples of the speech waveform. This is stated in the papers of Markhoul, John, Linear Prediction: A tutorial review, Proceedings of IEEE, 63(4) (1975), Li, Tze Fen, Speech recognition of mandarin monosyllables, Pattern Recognition 36(2003) 2713-2721, and in the book of Rabiner, Lawrence and Juang, Biing-Hwang, Fundamentals of Speech Recognition, Prentice Hall PTR, Englewood Cliffs, N.J., 1993. The LPCC to represent an English word (a Chinese syllable) provides a robust, reliable and accurate method for estimating the parameters that characterize the linear, time-varying system which is recently used to approximate the nonlinear, time-varying response system of the speech waveform. The MFCC method uses the bank of filters scaled according to the Mel scale to smooth the spectrum, performing a processing that is similar to that executed by the human ear. For recognition, the performance of the MFCC is said to be better than the LPCC using the dynamic time warping (DTW) process in the paper of Davis, S. B. and Mermelstein, P., Comparison of parametric representations for monosyllabic word recognition in continuously spoken sentences, IEEE Trans. Acoustic Speech Signal Process, ASSP-28(4), (1980), 357-366, but in the recent research including the present invention, the LPCC gives a better recognition than the MFCC by the use of the Bayesian classifier with much less computation time. There are several methods used to perform the task of utterance classification. A few of these methods which have been practically used in automatic speech recognition systems are dynamic time warping (DTW) pattern matching, vector quantization (VQ) and hidden Markov model (HMM) method. The above recognition methods give good recognition ability, but their methods are very computational intensive and require extraordinary computer processing time both in feature extraction and classification. Recently, the Bayesian classification technique tremendously reduces the processing time and gives better recognition than the HMM recognition system. This is given by the papers of Li, Tze Fen, Speech recognition of mandarin monosyllables, Pattern Recognition 36(2003) 2713-2721 and Chen, Y. K., Liu, C. Y., Chiang, G. H. and Lin, M. T., The recognition of mandarin monosyllables based on the discrete hidden Markov model, The 1990 Proceedings of Telecommunication Symposium, Taiwan, 1990, 133-137, but the feature extraction and compression procedures, with a lot of experimental and adjusted parameters and thresholds in the system, of the time-varying, nonlinear expanded and contracted feature vectors to an equal-sized pattern of feature values representing an English word or a Chinese syllable for classification are still complicate and time consuming. The main defect in the above or past speech recognition systems is that their systems use many arbitrary, artificial or experimental parameters or thresholds, especially using the MFCC feature. These parameters or thresholds must be adjusted before their systems are put in use. Furthermore, the existing recognition systems are not able to identify the English word or Chinese syllable in a fast or slow speech, which limits the recognition applicability and reliability of their systems.

Therefore, there is a need to find a simple speech recognition system, which can naturally and theoretically produce an equal-sized sequence of feature vectors to well represent the nonlinear time-varying waveform of an English word or a Chinese syllable so that each feature vector in the time sequence will be the same for the same English words or Chinese syllables and will be different for different English words or Chinese syllables, which provides a faster processing time, which does not have any arbitrary, artificial or experimental thresholds or parameters and which has an ability to identify the English words or Chinese syllables in a fast and slow utterance in order to extend its recognition applicability. The most important is that the speech recognition system must be very accurate to identify a word or syllable or a sentence.

SUMMARY OF THE INVENTION

It is therefore an object of the present invention to provide a method to overcome the aforementioned difficulties encountered in the prior art.

Specifically, it is an object of the present invention to provide a fixed number of elastic frames of equal length without filter and without overlap to normalize the waveform of variable length of an English word or a Chinese syllable to produce an equal-sized matrix of features to represent the English word or Chinese syllable such that the same English words or the same Chinese syllables have the same feature at the same time position and different English words or Chinese syllables have their different own features in the same time position in the matrix. The second object in the present invention is to provide a technique to extract an accurate feature which truly represents each English word or Chinese syllable and to define a clear territory of feature value for the English word or Chinese syllable to be easily identified by a classifier. The third object of the present invention is to provide a Bayesian decision classifier which gives the minimum probability of misclassification. The fourth object of the present invention is to provide a modification technique to improve the feature for an English word and a Chinese syllable such that the word or syllable is guaranteed to be identified. The fifth object of the present invention is to create the feature of a new English word or a new Chinese syllable, which does not have its samples in the sample database. The present invention has the following advantages:

(1). The pattern recognition system is naturally and theoretically derived based on the nonlinear time-varying waveforms without any arbitrary, or experimental parameters or thresholds in order to improve recognition ability.

(2). The uniform segmentation on the whole waveform of an English word (Chinese syllable) with E equal elastic frames without filter and without overlap can use the same j-th elastic frame, j=1, . . . , E, to catch in order the same feature for the same words (syllables) and different features for the different words (syllables).

(3). The pattern recognition system can immediately classify an unknown English word (Chinese syllable) after extraction of the feature by E elastic frames without further compressing or warping or adjusting the length of the sequence of features since the features are already pulled to the same time position.

(4). Since E elastic frames are not overlapped, less number of frames can cover the whole waveform of an English word (Chinese syllable) and save computation time both in training and recognition.

(5). E equal elastic frames segment the whole waveform of an English word (Chinese syllable) and can stretch and contract themselves to cover the whole speech waveform to produce an equal-sized matrix of features and hence the present invention can recognize an English word or a Chinese syllable with too short or too long speech waveform.

(6). The whole algorithm to extract feature and to classify an unknown word (syllable) is simple and time-saving.

(7). The main technique in the present invention is to find the K best samples on the basis of the Bayesian distance for each English word (Chinese syllable) and to extract the real feature for the English word (Chinese syllable) and hence tremendously raises the recognition ability.

(8). Another main technique in the present invention is to provide 3 skills to modify and improve the feature of an English word (Chinese syllable) such that the English word (Chinese syllable) is guaranteed to be correctly identified.

(9). The present invention provides a segmentation skill to segment an unknown English (Chinese) sentence or name into a set of D unknown English words (Chinese syllables) and a screening window to select a known English or Chinese sentence or name from the English and Chinese sentence and name database as the unknown English or Chinese sentence or name.

(10). The present invention provides a technique to create the feature of a new English word (a new Chinese syllable) which is not in the English word and Chinese syllable database.

DETAILED DESCRIPTION OF THE PREFERRED EMBODIMENT

Figure 1:
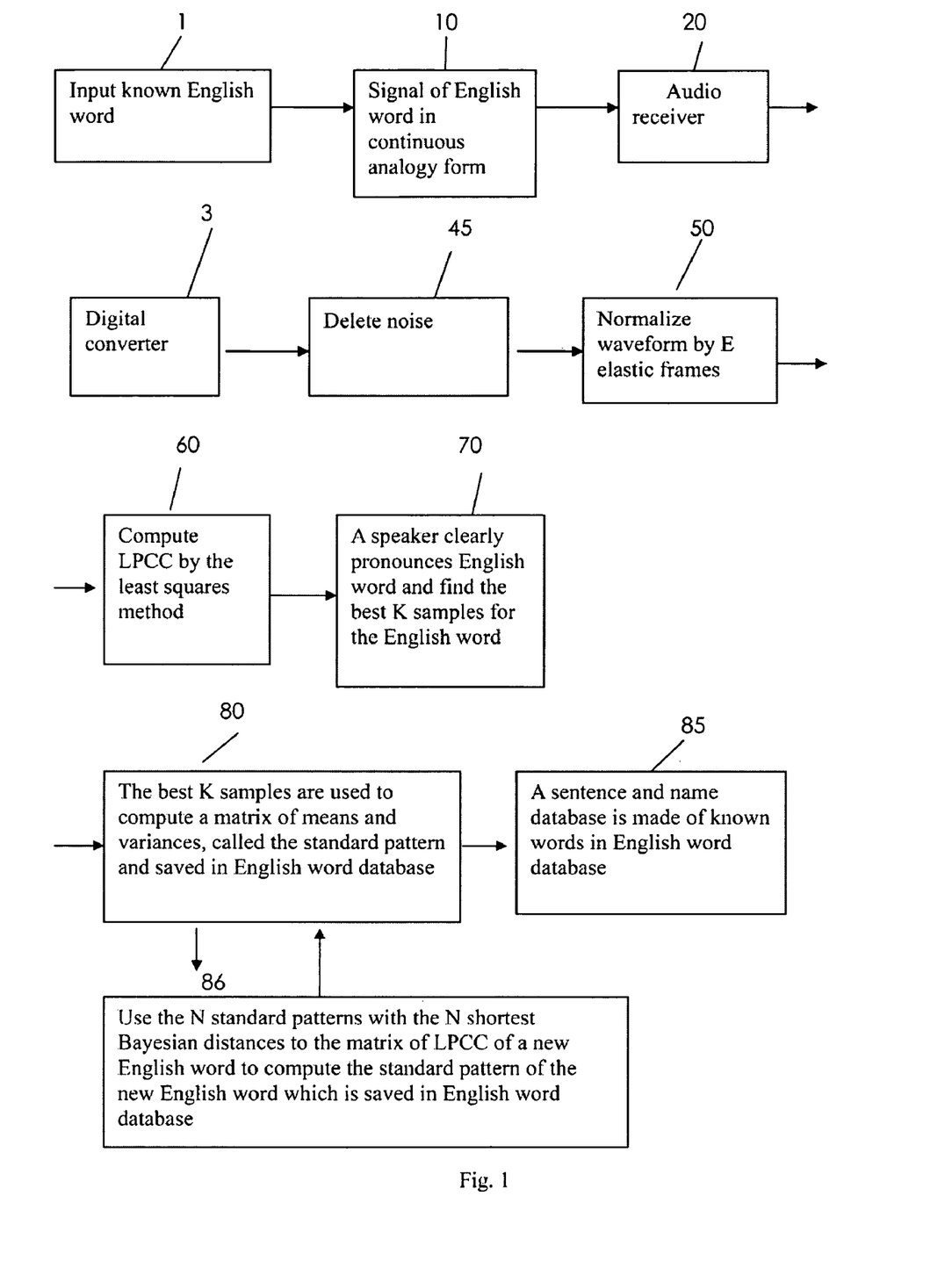
FIG. 1 is a flow-chart diagram showing how the English word and Chinese syllable database of equal-sized standard patterns denoting all known English words and Chinese syllables by using the best K samples for each English word or each Chinese syllable, the English and Chinese sentence and name database made of English words or Chinese syllables in the English word and Chinese syllable database and the feature (an equal-sized standard pattern) of a new English word or a new Chinese syllable are established.
Figure 2:
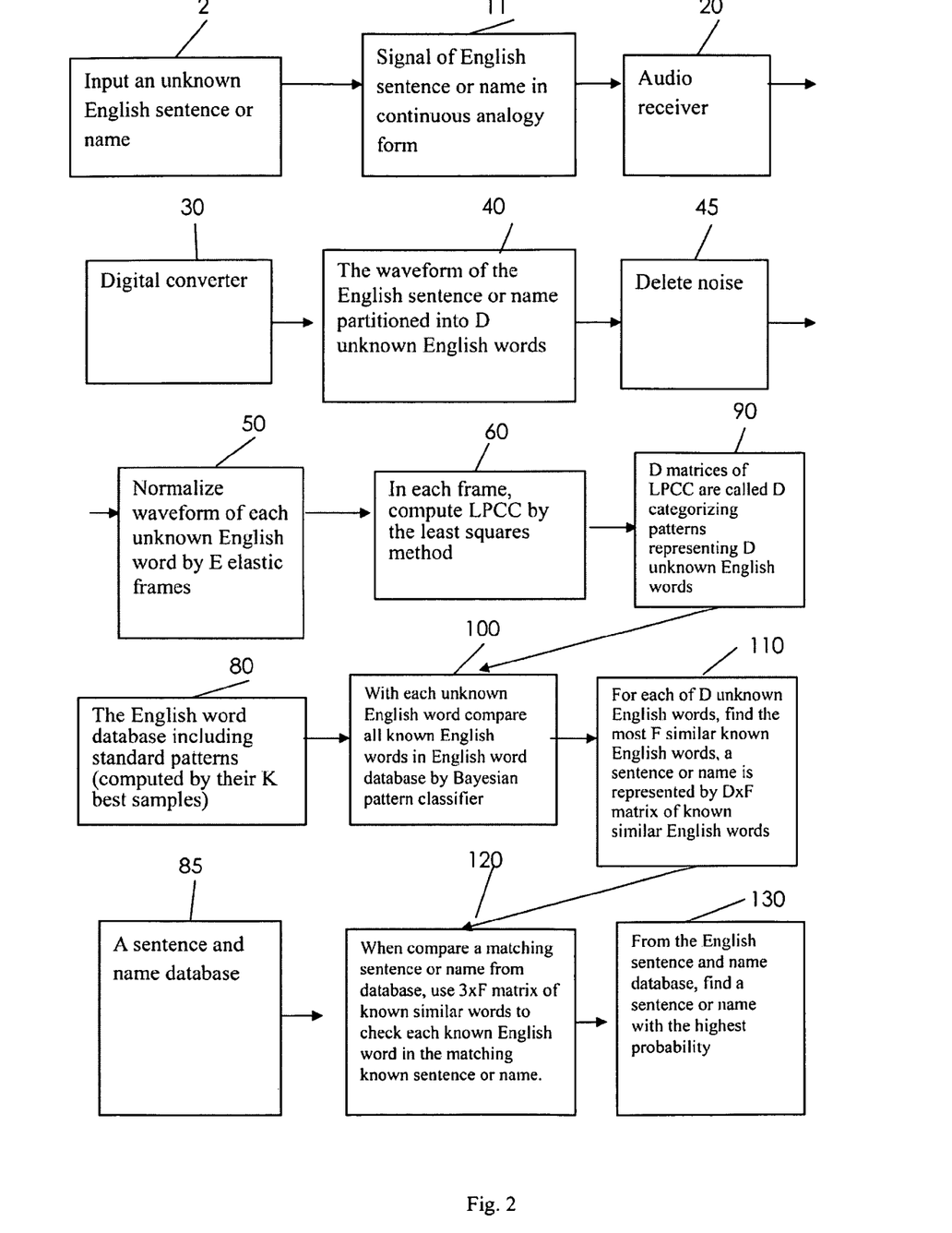
FIG. 2 is the flow-chart diagram showing the processing steps of segmentation of an unknown English or Chinese sentence or name into unknown English words (Chinese syllables), normalization of the waveform of each unknown English word (Chinese syllable) using E elastic frames without filter and without overlap, extraction of LPCC feature for each unknown English word (Chinese syllable) represented by an equal-sized matrix of LPCC and identification of each unknown English word (Chinese syllable) by the Bayesian classifier and finally identification of the unknown English or Chinese sentence or name by a screening window technique.

In the present invention, a Chinese syllable is considered as an English word with one single syllable and hence in FIG. 1 and FIG. 2, the flowcharts only show English words which include Chinese syllables.

FIG. 1 shows an input known English word (Chinese syllable) 1 which is continuous analog form 10 and which enters an audio receiver 20 for receiving a series of speech waveform representing the unknown English word (Chinese syllable) utterance. A digital converter 30 then converts this waveform into a series of digital signals. A preprocessor 45 receives the series of digital signals from the digital converter 30 to delete the noise and the time intervals which do not have word (syllable) digital signals. After deletion of noise, the waveform left from deletion forms a real speech waveform denoting a word (syllable) utterance. Then the total length of the new waveform denoting a word (syllable) is uniformly partitioned into E equal segments by E elastic frames 50 without filter and without overlap. Since the size of the frames is proportional to the total length of speech waveform denoting a word (syllable), the E frames are called the elastic frames which can stretch and contract themselves to cover the whole waveforms of variable length for the word (syllable). A word (syllable) has a waveform of variable length uttered by different speaker or even by the same speaker. Each word (syllable) has the same number E of equal elastic frames without overlap to cover its waveform, i.e., a word (syllable) with a short waveform has less sampled points in a frame and a word (syllable) with a long waveform has more sampled points in a frame. For the waveforms of various lengths denoting the same word (syllable), the sampled points both in a short frame and in a long frame carry the same amount of same feature information if they are recognized as the same word (syllable) by human ears. The E frames are plain and elastic without Hamming or any other filter and without overlap contracting themselves to cover the short speech waveform produced by the short pronunciation of a word (syllable) and stretching themselves to cover the long speech waveform produced by long pronunciation of a word (syllable) without the need of deleting or compressing or warping the sampled points or feature vectors as in the dynamic time-warping matching process and in the existent pattern recognition systems. After uniform segmentation processing on waveform with E equal elastic frames 50 without filter and without overlap to cover the waveform, the sampled points in each frame are used to compute 60 the least squares estimates of regression coefficients, since a sampled point of speech waveform is linearly dependent of the past sampled points by the paper of Makhoul, John, Linear Prediction: A tutorial review, Proceedings of IEEE, 63(4) (1975). The least squares estimates in a frame are called the linear predict coding coefficients (a LPC vector) having normal distributions, which are then converted into the more stable LPC cepstra (a LPC cepstra vector). This will be described below. The LPC cepstra of several word (syllable) samples uttered by different speakers for the same known word (syllable) are saved in the sample database. A speaker with clear and distinct pronunciation pronounces each known word (syllable) once 70. In the sample database, find the best K samples of each known word (syllable) on the basis of Bayesian distance described below. To each word (syllable), its best K samples closest to the known word (syllable) uttered by the speaker are used to compute the equal-sized matrix of means and variances of the LPCC. The equal-sized matrix of means and variances is called the standard pattern representing the known word (syllable). All equal-sized standard patterns (E×P matrices of means and variances computed from their best K samples) of known words (syllables) are saved in an English word and Chinese syllable database 80. This invention provides 3 skills to create the feature of a new English word or a new Chinese syllable 86. From the word and syllable database 80, make necessary sentences and names (a set of known words or syllables), which are saved in an English and Chinese sentence and name database 85.

FIG. 2 shows a speech recognition system. Begin with an input unknown sentence or name 2, which is a long signal waveform in a continuous analogy form 11, received by the audio receiver 20. A digital converter 30 then converts the long waveform into a series of digital signals. The speech recognition system in the invention partitions the unknown sentence or name into a set of D unknown English words (D unknown Chinese syllables) 40. Each unknown word (syllable) is represented by a sequence of digitized signal waveform data. A preprocessor deletes noise 45. The digital waveform data of each unknown word (syllable) is segmented into E equal intervals. Each interval is called an elastic frame 50. Therefore, E elastic frames are disjointed and do not use any filter. In each interval (elastic frame) of digital signal points, since the signal sampled point is a linear combination of previous sampled points, we can find the linear predict coding cepstra (LPCC) using the least squares method 60. A E×P matrix of LPCC is used to represent the unknown word (syllable) and the matrix of LPCC is called the categorizing pattern of the unknown word (syllable). Hence an English or Chinese sentence or name is represented by a sequence of D E×P matrices of LPCC, i.e., D unknown categorizing patterns 90. The invention uses a Bayesian pattern classifier to compare each of D unknown categorizing patterns with all known standard patterns from the English word and Chinese syllable database 100. In the unknown sentence or name, for each of D unknown words (syllables), find the most F similar known English words or Chinese syllables or both from the English word and Chinese syllable database with the F shortest Bayesian distances to the unknown word (syllable). The unknown sentence or name is represented by a D×F matrix of known similar words or syllables or both 110. The invention provides a 3×F screen window method to select a known sentence or name from the English and Chinese sentence and name database 120, which has the highest probability to be selected as the unknown sentence or name 130. The invention also provides 3 important skills to modify and improve the feature (means and variances) of a word (syllable) such that the recognition of an unknown sentence or name is guaranteed to be correct.

As follows is the detailed description of the present invention:

1. FIG. 1 shows the flowchart for establishing an English word and Chinese syllable database and an English and Chinese sentence and name database. When a known English word or a known Chinese syllable inputs 1, it is a series of speech signal in an analogy waveform 10 received by an audio receiver 20 and digitized into a sequence of sampled points 30. A method to eliminate noise in the invention is to use the sample variance of a fixed number of sequential sampled points to detect the real speech signal, i.e., the sampled points with small variance do not contain speech signal. Another way in the invention is to compute the sum of the absolute values of difference of two consecutive sampled points in a fixed number of sequential speech sampled points, i.e., the speech data with small sum of absolute values do not contain real speech signal. In our speech recognition experiment, the latter provides slightly faster and more accurate speech recognition.

2. In the invention, we first normalize the whole digital waveform and then extract the feature representing the known English word or the known Chinese syllable. Since in the paper of Markhoul, John, Linear Prediction: A Tutorial Review, Proceedings of the IEEE, 63(4), 1975, the sampled signal point S(n) can be linearly predicted from the past P sampled points, a linear approximation S'(n) of S(n) can be formulated as:

$$S'(n) = \sum_{k=1}^{P} \alpha_k S(n-k), n \geq 0 \quad (1)$$

where P is the number of the past samples and the least squares estimates $a_k$, k=1, ..., P, are generally referred to be the linear predict coding coefficients (a LPC vector) which have normal distributions. The LPC method (the least squares method) provides a robust, reliable and accurate method for estimating the linear regression parameters that characterize the linear, time-varying regression system which is used to approximate the nonlinear, time-varying system of the speech waveform of a word (syllable). Hence, in order to have a good estimation of the nonlinear time-varying system by the linear regression models, the invention uses a uniform segmentation on the speech waveforms. Each segment is called an elastic frame 50. There are E equal elastic frames without filter and without overlap which can freely contract or expand themselves to cover the whole speech waveform of the English word (Chinese syllable). E equal elastic frames can produce in order the same LPC feature vectors (the least squares estimates, which have normal distributions) by the least squares method 60 for the same English words (same Chinese syllables) which have various lengths of speech waveforms, even uttered by the same speaker. All signal sampled points are not filtered as in Hamming window. The number of the sampled points in a frame is proportional to the total points of a speech waveform. The same English word or the same Chinese syllable can be uttered in variable lengths of speech waveforms by the same or different speakers. For the same English words (Chinese syllables), a small number of sampled points in the j-th short frame of a short speech waveform carry the same amount of the same feature information as a large number of sampled points in the j-th long frame of a long speech waveform if they can be recognized as the same English word or Chinese syllable by human ears. From experiments, E=12 gives a better recognition rate. Let $E_1$ be the squared difference between S(n) and S'(n) over N+1 samples of S(n), n=0, 1, 2, ..., N, where N is the number of sampled points in a frame proportional to the length of speech waveform denoting an English word or a Chinese syllable, i.e., $$E_1 = \sum_{n=0}^{N}\left[S(n) - \sum_{k=1}^{P}\alpha_k S(n-k)\right]^2 \quad (2)$$

To minimize $E_1$, taking the partial derivative for each i=1, ..., P on the right side of (2) and equating it to zero, we obtain the set of normal equations:

$$\sum_{k=1}^{P}\alpha_k \sum_{n} S(n-k)S(n-i) = \sum_{n} S(n)S(n-i), \ 1 \le i \le P \quad (3)$$

Expanding (2) and substituting (3), the minimum total squared error, denoted by $E_P$ is shown to be $$E_P = \sum_{n} S^2(n) - \sum_{k=1}^{P}\alpha_k \sum_{n} S(n)S(n-k) \quad (4)$$

Eq (3) and Eq (4) then reduce to $$\sum_{k=1}^{P}\alpha_k R(i-k) = R(i), \ 1 \le i \le P \quad (5)$$

$$E_P = R(0) - \sum_{k=1}^{P}\alpha_k R(k) \quad (6)$$

respectively, where $$R(i) = \sum_{n=0}^{N-i} S(n)S(n+i), \ i \ge 0 \quad (7)$$

Durbin's recursive procedure in the book of Rabiner, L. and Juang, Biing-Hwang, Fundamentals of Speech Recognition, Prentice Hall PTR, Englewood Cliffs, N.J., 1993, can be specified as follows:

$$E_0 = R(0) \quad (8)$$

$$k_i = \left[R(i) - \sum_{j=1}^{i-1} a_j^{(i-1)} R(i-j)\right]/E_{i-1} \quad (9)$$

$$a_i^{(i)} = k_i \quad (10)$$

$$a_j^{(i)} = a_j^{(i-1)} - k_i a_{i-j}^{(i-1)}, \ 1 \le j \le i-1 \quad (11)$$

$$E_i = (1-k_i^2)E_{i-1} \quad (12)$$

Equ (8)-(12) are solved recursively for i=1, 2, ..., P. The final solution (LPC coefficient or least squares estimate) is given by $$a_j = a_j^{(P)}, \ 1 \le j \le P \quad (13)$$

The LPC coefficients are then transformed into the cepstra (LPCC) 60 $\hat{a}_i$, i=1, ..., P, in Rabiner and Juang's book, by $$\hat{a}_i = a_i + \sum_{j=1}^{i-1} \left(\frac{j}{i}\right) a_{i-j} \hat{a}_j, \ 1 \le i \le P \quad (14)$$

$$\hat{a}_i = \sum_{j=i-P}^{i-1} \left(\frac{j}{i}\right) a_{i-j} \hat{a}_j, \ P < i \quad (15)$$

Here in our experiments, P=12, because the cepstra in the last few elements are almost zeros. The whole waveform of the known English word (Chinese syllable) is transformed into a E×P matrix of LPCC. The same English word (Chinese syllable) is uttered many times by different speakers who produce many samples of the same known English word (Chinese syllable). Because of using E equal elastic frames, the samples of the known English word (Chinese syllable) are transformed into many E×P matrices of LPCC such that the LPCC are almost the same at the same time positions for all samples of the same known English word (Chinese syllable).

3. Many speakers, who utter the same known English word (Chinese syllable), produce many samples of the known English word (Chinese syllable), which are transformed by (8-15) into E×P matrices of LPCC. The E elastic frames normalize the sample waveforms of the known English word (Chinese syllable) such that they have about the same LPCC in the same time position in the matrices. The most important technique in the invention is to find the K best samples for each known English word (Chinese syllable) 70. For each known English word (Chinese syllable), a speaker with very clear and distinct pronunciation clearly pronounces once. From all samples of the known English word (Chinese syllable), use the Bayesian distance (Bayesian mis-categorization risk) to find the K best samples of the known English word (Chinese syllable) based on the K shortest Bayesian distances. The K best samples are used to compute the means and variances for the known English word (Chinese syllable) (or the variances are computed from all samples of the known word (syllable)). A E×P matrix of means and variances represents the known English word (Chinese syllable) and is called the standard pattern of the known English (Chinese syllable). The standard patterns made of their K best samples denoting all known English words and Chinese syllables are saved in an English word and Chinese syllable database 80. From the English word and Chinese syllable database, we can make any English (Chinese) sentences and names or any set of known English words (Chinese syllables) which are saved in the English and Chinese sentence and name database 85.

4. Use the E equal elastic frames without filter and without overlap and Durbin's recursive formula (8-15) to compute an equal-sized E×P matrix of LPCC of an unknown input English word (Chinese syllable). The E×P matrix of LPCC is called the categorizing pattern of the unknown English word (Chinese syllable).

5. If a new English word (Chinese syllable) does not have any sample, let $x_{jl}$, j=1, . . . , E, l=1, . . . , P, be the matrix of LPCC representing the new English word (Chinese syllable). Use the Bayesian classifier described below to find the best N standard patterns in the English word and Chinese syllable database with the N shortest Bayesian distances to the new word (syllable) and use the average (weighted average) of means and variances in the N standard patterns to be the standard pattern (feature) of the new English word (Chinese syllable) 86 and save it in the English word and Chinese syllable database 80.

6. FIG. 2 shows a flowchart of recognition for an unknown English (Chinese syllable) sentence or name. We first input an unknown English (Chinese) sentence or name 2 which is a speech signal in the analogy waveform 11 received by an audio receiver 20. The analogy waveform of the unknown sentence or name is digitized into a series of speech sampled points 30. The series of sampled points is partitioned into D unknown English words or D unknown Chinese syllables. The number D may not the actual number of unknown words (syllables), i.e., the unknown sentence or name may contain D−1 or D+1 words (syllables). The partition skill is to add the absolute distances between any two consecutive sampled points in a unit time interval. If the total of absolute distances is less than the total of absolute distances of noise points, the unit time interval does not contain speech signal. If the unit time intervals without speech signals are cumulated to a certain amount (more than the time between two syllables in an English word), they must be a border line between two unknown English words or Chinese syllables 40. The noise of each of D unknown English words (Chinese syllables) in the unknown sentence or name is deleted 45. After deletion, the speech digital waveform of each of D unknown English words (Chinese syllables) is normalized by E equal elastic frames without filter and without overlap 50. In each frame, the speech digital waveform is used to compute LPCC by using the least squares method 60. An unknown English word (Chinese syllable) in the sentence or name is represented by an equal-sized E×P matrix of LPCC. Hence an unknown sentence or name is represented by D matrices of LPCC 90.

7. The speech processor 100 now receives the categorizing pattern of E LPC cepstra vectors denoting an unknown English words (Chinese syllables), represented by X=$(X_1, \ldots, X_E)$, with $X_j$ denoting the j-th vector of P LPC cepstra $X_j=(X_{j1}, \ldots, X_{jP})$ computed from sampled points of the speech waveform in the j-th equal elastic frame by the least squares method. The categorizing pattern of E feature vectors $(X_1, \ldots, X_E)$ is a E×P matrix of LPC cepstra X=$\{X_{jl}\}$, j=1, . . . , E, l=1, . . . , P, where the random variables $\{X_{jl}\}$ have normal distributions and E=P=12. The unknown English words (Chinese syllables) belongs to one of m categories (m is the total number of known English words and known Chinese syllables) $\omega_i$, i=1, . . . , m. Consider the decision problem consisting of determining whether X belongs to $\omega_i$. Let $f(x|\omega_i)$ be the conditional density function of X of the unknown English words (Chinese syllables) given the known English words (Chinese syllables) $\omega_i$. Let $\theta_i$ be the prior probability of $\omega_i$ such that $\Sigma_{i=1}^m \theta_i=1$, i.e., the $\theta_i$ is the probability for the category $\omega_i$ to occur. Let d be a decision rule. A simple loss function $L(\omega_i,d(x))$, i=1, . . . , m, is used such that the loss $L(\omega_i,d(x))=1$ when $d(x)\neq\omega_i$ makes a wrong decision and the loss $L(\omega_i,d(x))=0$ when $d(x)=\omega_i$ makes a right decision. Let $\tau=(\theta_1, \ldots, \theta_m)$ and let $R(\tau, d)$ denote the risk function (the probability of misclassification) of d. Let $\Gamma_i$, i=1, . . . , m, be m regions separated by d in the E×P-dimensional domain of X, i.e., d decides $\omega_i$ when $X\in\Gamma_i$. Then the minimum probability of misclassification is $$R(\tau, d) = \sum_{i=1}^m \theta_i \int L(\omega_i, d(x))f(x|\omega_i)dx \qquad (16)$$

$$= \sum_{i=1}^m \theta_i \int_{\Gamma_i^c} f(x|\omega_i)dx$$

where $\Gamma_i^c$ is the complement of $\Gamma_i$. Let D be the family of all decision rules which separate m categories. Let the minimum probability of misclassification be denoted by $$R(\tau, d_\tau) = \min_{d \in D} R(\tau, d) \qquad (17)$$

A decision rule $d_\tau$ which satisfies (17) is called the Bayes decision rule with respect to the prior distribution τ and can be represented as:

$$d_\tau(x) = \omega_i \text{ if } \theta_i f(x|\omega_i) > \theta_j f(x|\omega_j) \qquad (18)$$

for all j≠i, i.e., $\Gamma_i = \{x | \theta_i f(x|\omega_i) > \theta_j f(x|\omega_j)\}$ for all j≠i.

The E×P feature values of the E×P matrix of LPC cepstra denoted by x=$\{x_{jl}\}$ in the categorizing pattern denoting an unknown English words (Chinese syllables) are assumed to have independent normal distributions (LPC vector has normal distributions). The conditional normal density of x=$\{x_{jl}\}$ given the known English words (Chinese syllables) hi can be represented as $$f(x|\omega_i) = \left[\prod_{jl} \frac{1}{\sqrt{2\pi}\,\sigma_{ijl}}\right] e^{-\frac{1}{2}\sum_{jl}\left(\frac{x_{jl}-\mu_{ijl}}{\sigma_{ijl}}\right)^2} \qquad (19)$$

where i=1, . . . , m (m=the total number of known English words and Chinese syllables). Taking logarithm on both sides of (19), the Bayes decision rule (18) with equal prior on each word or syllable becomes $$l(\omega_i) = \sum_{jl} \ln(\sigma_{ijl}) + \frac{1}{2} \sum_{jl} \left(\frac{x_{jl} - \mu_{ijl}}{\sigma_{ijl}}\right)^2, i = 1, \ldots, m. \quad (20)$$

In (20), the value $l(\omega_i)$ means the difference between the LPC cepstra $x_{jl}$ 90 of the unknown English words (Chinese syllables) and the means $\mu_{ijl}$ 80 of each known words or syllable weighted by the variances $\sigma_{ijl}^2$ 80 of the known English words (Chinese syllables), where $\mu_{ijl}$ is estimated by sample means computed by its K best samples and where $\sigma_{ijl}^2$ is estimated by the sample variance computed from all samples of the known English word or the known Chinese syllable $\omega_i$ stored in an equal-sized standard pattern denoting the known English words (Chinese syllables). The Bayes decision rule (20), which is called the Bayesian distance (Bayesian miscategorization risk) and measures the similarity between the unknown English word (Chinese syllable) X={$X_{jl}$} and the known word (syllable) $\omega_i$, decides a known English word or a known Chinese syllable $\omega_i$ with the least $l(\omega_i)$ to which the unknown English word (Chinese syllable) with the feature matrix X={$X_{jl}$} belongs 100.

8. The most important technique in the present invention is to find the best K samples of each known English word or each known Chinese syllable. For each known English word (Chinese syllable) $\omega_i$, the E×P mean matrix computed from its best K samples can represent the true and accurate feature (144 real and accurate center points) and the E×P variance matrix can represent a true and accurate territory $$\Gamma_i = \{x | \theta_i f(x|\omega_i) > \theta_j f(x|\omega_j)\}, j \neq i \quad (21)$$

defined by Bayesian decision rule such that it does not overlap with the territory of any other known English word (Chinese syllable).

A speaker with clear and distinct pronunciation utters each known English word (Chinese syllable) $\omega_i$ once. Let x={$x_{jl}$} be the E×P matrix of LPCC of the English word (Chinese syllable) $\omega_i$ uttered by the clear speaker and let $x_i^k$={$x_{ijl}^k$} denote the E×P matrix of LPCC of the k-th sample of the known English word (Chinese syllable) $\omega_i$. Use the following Bayesian distance to measure the similarity between x={$x_{jl}$} uttered by the clear speaker and the k-th sample of $\omega_i$, $$l(x_i^k) = \sum_{jl} \ln(\sigma_{ijl}) + \frac{1}{2} \sum_{jl} \left(\frac{x_{jl} - x_{ijl}^k}{\sigma_{ijl}}\right)^2. \quad (22)$$

where $\sigma_{ijl}^2$ is replaced by the variances computed by all samples $x_i^k$ of the known English word (Chinese syllable) $\omega_i$. Use the Bayesian distance (22) to find the best K samples $x_i^k$ with the K shortest Bayesian distances (22). The K best samples of the known English word (Chinese syllable) $\omega_i$ are used to compute the means and variances (or use all samples of word (syllable) $\omega_i$ to compute the variances). The E×P matrix of means and variances computed by the K best samples is called the standard pattern of English word (Chinese syllable) $\omega_i$ and saved in the English word and Chinese syllable database 80. All English (Chinese) sentences and names made of known English words (Chinese syllables) from the English word and Chinese syllable database form an English and Chinese sentence and name database 85. The standard pattern computed from the K best samples tremendously raises the recognition ability of the Bayesian classifier.

9. The present invention provides another important technique to modify and improve the features of an English word (Chinese syllable) and to create the feature of a new input English word (Chinese syllable) such that the English word (Chinese syllable) and the new word (syllable) are guaranteed to be recognized correctly. This invention provides three skills to improve the feature of a word (syllable) and to create the feature of a new English word or Chinese syllable:

(a). If input an unknown English word or Chinese syllable $\omega$ or input a new English word (Chinese syllable) $\omega$, the Bayesian pattern matching classifier (20) selects a wrong known English word or Chinese syllable $\omega'$ with the least Bayesian distance $l(\omega')$ to be the unknown word (syllable) or the new word (syllable) $\omega$. Then the unknown English word (Chinese syllable) or the new word (Chinese syllable) $\omega$ is called word (syllable) A and the wrong known English word or Chinese syllable $\omega'$ with the least Bayesian distance $l(\omega')$ (20) is called word (syllable) B. Since it gives a wrong recognition, the best K samples of word (syllable) A are not in the samples of word (syllable) A. The best K samples of word (syllable) A must be in the samples of word (syllable) B. Hence, we have to modify the feature of word (syllable) A or to create the real feature of the new word (syllable) A. We have to find the best K samples of word (syllable) A from the samples of word (syllable) B and use the best K samples from word (syllable) B to compute the standard pattern of word (syllable) A, i.e., use the best K samples from the samples of word (syllable) B to compute the means for word (syllable) A and all samples of word (syllable) B to compute the variances for word (syllable) A. The unknown English word (syllable) or the new English word (syllable) $\omega$ will be recognized correctly.

(b). Use the Bayesian classifier (20) to find the top N similar English words or Chinese syllables or both denoted by N matrices of means and variances {$\mu_{ijl}, \sigma_{ijl}^2$}, i=1, . . . , N, from the English word and Chinese syllable database with the N shortest Bayesian distances (20) to the unknown word (syllable) or the new word (syllable) $\omega$. Find the average (weighted average) of N matrices, $\mu_{jl} = \Sigma_{i=1}^N \mu_{ijl}/N$, $\sigma_{jl}^2 = \Sigma_{i=1}^N \sigma_2/N$. The average {$\mu_{jl}, \sigma_{jl}^2$}, j=1, . . . , E, l=1, . . . , P, is used as the new feature of the unknown English word (syllable) or the new English word (syllable) $\omega$.

(c). Denote the matrix of LPCC of the unknown English word (Chinese syllable) uttered by the test speaker or a new word (syllable) $\omega$ as $\mu_{jl}$ and denote the average of the variances $\sigma_{ijl}^2$ of the top N similar English words and Chinese syllables as $\sigma_{jl}^2$ in (b). Then {$\mu_{jl}, \sigma_{jl}^2$}, j=1, . . . , E, l=1, . . . , P, is used as the new feature of the unknown English word (Chinese syllable) or the new English word (Chinese syllable) $\omega$.

10. The present invention is able to classify the Chinese language since a Chinese syllable is considered as a word, i.e., an English word with one single syllable.

11. Since both all English words and all Chinese syllables are represented by the equal-sized E×P matrix of LPCC and both features are represented by the equal-sized E×P matrix of means and variances, this present invention is capable of recognizing both English and Chinese at the same time from a mixture of English and Chinese sentences, names and English words and Chinese syllables.

12. In order to show the recognition rate and fast recognition both on Chinese and English by the present invention, we implement a series of speech recognition experiments in Chinese and in English and in a mixture of English and Chinese:

(a). First of all, we have to build a sample database of commonly-used mandarin syllables. We bought such a sample database from the Central Research Institute in Taiwan, which has a bad quality (some syllables have very few samples or some have incomplete waveforms). They all are uttered by several hundreds of female speakers. We select the syllables which have at least 6 complete samples. The syllable database which we are able to use for testing has 388 commonly-used mandarin syllables with 6 to 99 samples. The total number of samples in the sample database is 12400. Unfortunately, we do not have any sample in English. We use the most important technique in 9(b) in this invention to create the features (standard patterns) of 155 English words extracted from the features of 388 mandarin syllables using the top N mandarin syllables with the N shortest Bayesian distances (20) to each English word to compute the means and variances for each of 155 English words. The recognition rate on 155 English words without having any samples is excellent. We use the same technique to create the features (standard patterns) of 270 new Chinese syllables which have no samples.

(b). Using the method in (2), transform all samples into 12400 E×P matrices of LPCC. A clear speaker pronounces 388 mandarin syllables once. Use the Bayesian distance (22) to find the best K samples for each of 388 mandarin syllables which are used to compute the means and variances of LPCC. The E×P matrix of means and variances is saved in the Chinese syllable database as the standard pattern of the syllable. Therefore, the basic syllable database only contains the standard patterns of 388 Chinese syllables in Table 1, which have samples bought from the central research institute in Taiwan. Use the technique in 9(b) to create the features (standard patterns) of 155 English words in Table 2 and 270 new Chinese syllables in Table 3. The technique is simple. The speech waveform of a new English word or a new Chinese syllable is transformed by the E elastic frames into an equal-sized E×P matrix of LPCC. Use the Bayesian classifier (20) for the matrix of LPCC of each new word (syllable) to find the top N standard patterns from 388 mandarin syllables. The average of means and variances of N standard patterns of the top N mandarin syllables with the N shortest Bayesian distances to the new English word or the new Chinese syllable is used to be the feature of the new word (syllable). Therefore, the total word and syllable database contains 388 Chinese syllables, 270 new Chinese syllables and 155 new English words.

(c). For the English word and Chinese syllable speech recognition tests, if an unknown input English word or an unknown input Chinese syllable is classified as within top 3 candidates, the recognition is good since too many similar words or syllables are in the database. The following experiments are conducted. The recognition rates depend on speakers.

(i). to classify 388 Chinese syllables (recognition rate=excellent)

(ii). to classify 155 English words (recognition rate=excellent)

(iii). to classify 388 Chinese syllables and 155 English words (recognition rate=excellent)

(iv). to classify 388 Chinese syllables and 270 new Chinese syllables (recognition=good) excellent=almost all are correct, good=90% correct.

TABLE 1

The following are 388 mandarin syllables whose samples are bought from the Central Research Institute in Taiwan

| 一七三上下不 | 且丟並中乃之 | 九也亂了二五 | 些亞人仍他代 | 但住佛你來便 | 係促修倆 |
|---|---|---|---|---|---|
| 個們做停側偵 | 元光內全兩八 | 六共冷列別到 | 刷則剖創勤區 | 千午卡卻參及 | 反受口另 |
| 可台吃同名向 | 否呂呢周和品 | 哈唯噴囊四因 | 國圍團在均抗 | 坤乘堂報場塞 | 壞外多夢 |
| 大天套奧女如 | 娘娟嫩孫學宅 | 定家寧將尋對 | 小少屆層屯山 | 岁崔崖崩差平 | 年度庫康 |
| 廖廟張強彭很 | 後得從忙快您 | 怕性怪恩怨愛 | 起應成我或戰 | 所才批找抓抽 | 拉抱捉掛 |
| 推接提揖揉撞 | 擅擺擾擊敵文 | 新方旁日昂晉 | 是暖更省最會 | 月有朝木本李 | 村東林某 |
| 查栓案桌桑條 | 樺蘇植業榮樓 | 横横歇正此歲 | 段殺每比民水 | 決況法波洪洽 | 派混港溪 |
| 準滅滾漢漂澗 | 濱炸為然熟片 | 牛特率王瑞瓊 | 瓦甚產用略醬 | 百的盤省看㟁 | 福空窖窺 |
| 站第等筑管節 | 米組給經縣總 | 羅群翁老考肉 | 肯能自與船縫 | 若茂草莊莫华 | 茵藏蘇蘭 |
| 唐處號行裘衰 | 被要言訊設許 | 該說維綢誤調 | 話謬讓讚豐貴 | 賈賊購賽賊走 | 跌跑齦跨 |
| 踐路車較輪悖 | 農追逃逅運遷 | 潭選還那邱郎 | 都配金錯錦鐵 | 銀開門阿陳雄 | 雙非面順 |
| 頓頭類類饑馬 | 騰高間鳥黃黑 | 點容 | | | |

TABLE 2

The following are 155 new English words which do not have any samples. The features of 155 English words are created by the features of 388 mandarin syllables in Table 1 using the average of the features of the top N = 10 mandarin syllables as the feature of a new English word.

one two three four five six seven eight nine ten chicken turkey egg duck
goose swan cow sheep panda bear cat dog rabbit horse peacock bird fish
pork beef snake bee fly mosquito flower red white black green blue water
wine vegetable tiger bear lion deer happy rice bread wheat soybean I like
you is can catch swim in China has diner and run fast full sky cloud
many eat grass are your good animal breakfast tea bite beautiful house thank
father call we study English made a mistake he knock at my door she
girl listen to me write letter buy new car work hard celebrate birthday
drink coke student mathematics tomorrow New York don't bridge safe for automobile TABLE 2-continued The following are 155 new English words which do not have any samples. The features of 155 English words are created by the features of 388 mandarin syllables in Table 1 using the average of the features of the top N = 10 mandarin syllables as the feature of a new English word.

gasoline too expensive price go high much granddaughter agree with opinion clean professor coffee drive smart meet help from after food American sorry bother who rain will tonight am smile be careful about health medicine have it note:
panda bear, New York, granddaughter are considered as a single English word denoted by a 12 × 12 matrix of means and variances.

TABLE 3

The following are 270 new mandarin syllables which do not have samples. The features of 270 mandarin syllables are created by 388 mandarin syllables in Table 1 using the average of the features of the top N mandarin syllables.

| | | | | | |
|---|---|---|---|---|---|
| +Z,109 | +Z,110 | +Z,111 | +Z,112 | +Z,113 | +Z,114 |
| +Z,115 | +Z,116 | +Z,117 | +Z,118 | +Z,119 | +Z,120 |
| +Z,121 | +Z,122 | +Z,123 | +Z,124 | +Z,125 | +Z,126 |
| +Z,127 | +Z,128 | +Z,129 | +Z,130 | +Z,131 | +Z,132 |
| +Z,133 | +Z,134 | +Z,135 | +Z,136 | +Z,137 | +Z,138 |
| +Z,139 | +Z,140 | +Z,141 | +Z,142 | +Z,143 | +Z,144 |
| +Z,145 | +Z,146 | +Z,147 | +Z,148 | +Z,149 | +Z,150 |
| +Z,151 | +Z,152 | +Z,153 | +Z,154 | +Z,155 | +Z,156 |

13. To classify an unknown English or Chinese sentence or name, we first build an English and Chinese sentence and name database 85, which contains both English and Chinese sentences and names. The speech recognition method for an unknown English or Chinese sentence or name is described as follows:

(a). An English or Chinese sentence or name is represented by a long sequence of speech sampled points. In an unit time interval, we first compute total sum of distances between any two consecutive points. If the total sum is less than the total sum of noise, the unit interval does not have speech signal. If the unit time intervals without speech signal are cumulated to a certain amount (more than the time between two syllables in an English word), it must be a border line between two unknown English words (a Chinese syllable is considered as an English word with one syllable). The unknown sentence or name is partitioned into D unknown English words or D unknown Chinese syllables.

(b). In the English and Chinese sentence and name database, find the unknown sentence or name uttered by a speaker. Since an unknown word (syllable) may be partitioned into two words (syllables), in the English and Chinese sentence and name database, pick up the sentences or names with D−1, D and D+1 known English words (Chinese syllables) for matching the unknown sentence or name.

(c). To each of D unknown English words (Chinese syllables), from the English word and Chinese syllable database 80, find the F most similar known English words or Chinese syllables or both using the Bayesian classifier (20). The F E×P matrices of means and variances have the F shortest Bayesian distances from the E×P matrix of LPCC representing the unknown word (syllable). Therefore, The F matrices may represent English words or Chinese syllables. An unknown sentence or name is represented by D×F matrices of similar known English words or Chinese syllables or both.

(d). If a matching known sentence or name in the English and Chinese sentence and name database 85 has exact D known English words or Chinese syllables, then match each known English word (Chinese syllable) of the matching known English (Chinese) sentence or name with F similar known English words and Chinese syllables in order from the first row to the last one. If each row of F similar words (syllables) contains its corresponding known word (syllable) of the matching sentence or name, there are a number of D unknown English words (Chinese syllables) recognized correctly. Hence the matching sentence or name is the unknown sentence or name uttered by the speaker.

(e). If a matching known sentence or name in the sentence and name database 85 does not have the exact number of D known words (syllables) or in (d), at least one row of F similar known words and syllables does not have a known word (syllable) of the matching sentence or name, we use 3×F screen window (3×F matrix of similar words and syllables) to find the unknown sentence or name. If the 3×F screen window contains the (i−1)-th, i-th and (i+1)-th rows of similar known words and syllables, the screen window checks the i-th known word (syllable) of the matching sentence or name (of course, the first 2 rows only check the first known word (syllable) of the matching sentence and name) and compute the probability (the number of known words (syllables) of the matching sentence or name in the 3×F screen window divided by total number of words (syllables) in the matching sentence or name). Our 3×F screen window selects the matching sentence or name in the English and Chinese sentence and name database 85 with the highest probability.

(f). If the selected matching sentence or name is not the unknown sentence or name uttered by speaker, there must be one or more unknown words (syllables) which are not in the D×F matrix of similar known words and syllables. We use any of 3 skills in 9 to improve the feature of the unknown word (syllable). The same unknown sentence or name is guaranteed to be recognized correctly.

(g). We conduct 4 recognition tests for sentences and names. The recognition rates depend on test speakers:
(i). to classify 70 English sentences and names made of 155 English words (recognition rate=excellent)
(ii). to classify 407 mandarin sentences and names made of 388 mandarin syllables (recognition rate=excellent)

(iii). to classify 70 English sentences and names and 407 Mandarin sentences and names, i.e., the English and Chinese sentence and name database in Table 4 contains 70 English sentences and names and 407 mandarin sentences and names (recognition rate=excellent);

(iv). to classify 559 mandarin sentences and names (407 made of 388 mandarin syllables and 152 made of 270 mandarin syllables without samples) (recognition rate=good) excellent=almost all are identified and good=90%

TABLE 4

The following is the English and Chinese sentence and name database made of 155 English words in Table 2 and 388 mandarin syllables in Table 1. There are 70 English sentences and names and 407 Chinese sentences and names. This is the main database for the invention to classify both English and Chinese.

1 I like beef 2 you like chicken 3 flower is red 4 bird can fly 5 black cat catch fish 6 duck swim in water 7 China has panda bear 8 dinner has vegetable and pork 9 horse run fast 10 bread has full wheat 11 blue sky and white cloud 12 many cow eat grass 13 China has rice 14 are you happy 15 tiger and lion are animal 16 breakfast has egg and bread 17 you like green tea and black coffee 18 many mosquito bite you 19 peacock is beautiful 20 deer run fast 21 your father call you 22 we study English 23 he write a letter 24 you made a mistake 25 he knock at my door 26 she is a girl 27 listen to me 28 you work hard 29 you buy a new car 30 we celebrate your birthday 31 you drink wine and I drink coke 32 student study mathematics 33 tomorrow I fly to New York 34 I don't like mathematics 35 bridge is safe for automobile 36 gasoline is too expensive 37 gasoline price go high 38 my granddaughter is beautiful 39 I agree with your opinion 40 I clean my house 41 my granddaughter eat breakfast 42 don't drink wine you have to drive 43 panda bear eat vegetable 44 professor like to run 45 mathematics professor is smart 46 cow eat grass 47 peacock is a bird 48 I am happy to meet you 49 thank you for your help 50 sheep eat grass and drink water 51 I eat bread and egg for breakfast 52 duck can swim and fly 53 professor and student work hard 54 beef is made from cow 55 a new car is expensive 56 New York has many car 57 you eat too much 58 a horse run after car 59 a cat run after rabbit 60 vegetable and soybean are good food 61 you are American 62 I am sorry to bother you 63 I don't like fast food 64 who are you 65 it will rain tonight 66 I am good in mathematics 67 she smile to me 68 be careful about your health 69 medicine is hard to study 70 thank you for your food
71 +Z,160  72 +Z,161  73 +Z,162  74 +Z,163  75 +Z,164  76 +Z,165  77 +Z,166
78 +Z,167  79 +Z,168  80 +Z,169  81 +Z,170  82 +Z,171  12 83 +Z,172
84 +Z,173  85 +Z,174  86 +Z,175  87 +Z,176  88 +Z,177  89 +Z,178  90 +Z,179
91 +Z,180  92 +Z,181  93 +Z,182  94 +Z,183  95 +Z,184  96 +Z,185  97 +Z,186
98 +Z,187  99 +Z,188  100 +Z,189  101 +Z,190  102 +Z,191  103 +Z,192  104 +Z,193
+Z,194  105 +Z,195  106 +Z,196  107 +Z,197  108 +Z,198  109 +Z,199  110 +Z,200  111 +Z,201
+Z,202  112 +Z,203  113 +Z,204  114 +Z,205  115 +Z,206  116 +Z,207
+Z,208  117 +Z,209  118 +Z,210  119 +Z,211  120 +Z,212  121 +Z,213  122 +Z,214
+Z,215  123 +Z,216  124 +Z,217  125 +Z,218  126 +Z,219  127 +Z,220
128 +Z,221  129 +Z,222  130 +Z,223  131 +Z,224  132 +Z,225  133 +Z,226  134 +Z,227
+Z,228  135 +Z,229  136 +Z,230  137 +Z,231  138 +Z,232  139 +Z,233
140 +Z,234  141 +Z,235  142 +Z,236  143 +Z,237  144 +Z,238  145 +Z,239
146 +Z,240  147 +Z,241  148 +Z,242  149 +Z,243  150 +Z,244
151 +Z,245  152 +Z,246  153 +Z,247  154 +Z,248  155 +Z,249  156 +Z,250
+Z,251  157 +Z,252  158 +Z,253  159 +Z,254  160 +Z,255  161 +Z,256
+Z,257  162 +Z,258  163 +Z,259  164 +Z,260  165 +Z,261  166 +Z,262
167 +Z,263  168 +Z,264  169 +Z,265  170 +Z,266  171 +Z,267  172 +Z,268
+Z,269  173 +Z,270  174 +Z,271  175 +Z,272  176 +Z,273  177 +Z,274  178 +Z,275
+Z,276  179 +Z,277  180 +Z,278  181 +Z,279  182 +Z,280  183 +Z,281
+Z,282  184 +Z,283  185 +Z,284  186 +Z,285  187 +Z,286  188 +Z,287
+Z,288  189 +Z,289  190 +Z,290  191 +Z,292  192 +Z,293  193 +Z,294
194 +Z,295  195 +Z,296  196 +Z,297  197 +Z,298  198 +Z,299  199 +Z,300
200 +Z,301  201 +Z,302  202 +Z,303  203 +Z,304  204 +Z,305
205 +Z,306  206 +Z,307  207 +Z,308  208 +Z,309  209 +Z,310
210 +Z,311  211 +Z,312  212 +Z,313  213 +Z,314  214 +Z,315
215 +Z,316  216 +Z,317  217 +Z,318  218 +Z,319  219 +Z,320
220 +Z,321  221 +Z,322  222 +Z,323  223 +Z,324  224 +Z,325
225 +Z,326  226 +Z,327  227 +Z,328  228 +Z,329  229 +Z,330
230 +Z,331  231 +Z,332  232 +Z,333  233 +Z,334
234 +Z,335  235 +Z,336  236 +Z,337  237 +Z,338  238 +Z,339
239 +Z,340  240 +Z,341  241 +Z,342  242 +Z,343  243 +Z,344  244 +Z,345
+Z,346  245 +Z,347  246 +Z,348  247 +Z,349  248 +Z,350
+Z,351  249 +Z,352  250 +Z,353  251 +Z,354  252 +Z,355
253 +Z,356  254 +Z,357  255 +Z,358  256 +Z,359  257 +Z,360
258 +Z,361  259 +Z,362  260 +Z,363  261 +Z,364  262 +Z,365
+Z,366  263 +Z,367  264 +Z,368  265 +Z,369  266 chicken American +Z,370
267 +Z,371  268 +Z,372  269 +Z,373  270 +Z,374  271 +Z,375
+Z,376  272 +Z,377  273 +Z,378  274 +Z,379  275 +Z,380  276 +Z,381
+Z,382  277 +Z,383  278 +Z,384  279 +Z,385  280 +Z,386  281 +Z,387
+Z,388  282 +Z,389  283 +Z,390  284 +Z,391  285 +Z,392
286 +Z,393  287 +Z,394  288 +Z,395  289 +Z,396  290 +Z,397  291 +Z,398
+Z,399  292 +Z,400  293 +Z,401  294 +Z,402  295 +Z,403  296 +Z,404
297 +Z,405  298 +Z,406  299 +Z,407  300 +Z,408  301 +Z,409
302 +Z,410  303 +Z,411  304 +Z,412  305 +Z,413  306 +Z,414
307 +Z,415  308 +Z,416  309 +Z,417  310 +Z,418  311 +Z,419  312 +Z,420
+Z,421  313 +Z,422  314 +Z,423  315 +Z,424  316 +Z,425
317 +Z,426  318 +Z,427  319 +Z,428  320 +Z,429
321 +Z,430  322 +Z,431  323 +Z,432  324 +Z,433  325 +Z,434
326 +Z,435  327 +Z,436  328 +Z,437  329 +Z,438  330 +Z,439
+Z,440  331 +Z,441  332 +Z,442  333 +Z,443  334 +Z,444

TABLE 4-continued

The following is the English and Chinese sentence and name database made of 155 English words in Table 2 and 388 mandarin syllables in Table 1. There are 70 English sentences and names and 407 Chinese sentences and names. This is the main database for the invention to classify both English and Chinese.

```
335 +Z,445  336 +Z,446  337 +Z,447  338 +Z,448  339 +Z,449
+Z,450  340 +Z,451  341 +Z,452  342 +Z,453  343 +Z,454
344 +Z,455  345 +Z,456  346 +Z,457  347 +Z,458  348 +Z,459
+Z,460  349 +Z,461  350 +Z,462  351 +Z,463  352 +Z,464  353 +Z,465
+Z,466  354 +Z,467  355 +Z,468  356 +Z,469  357 +Z,470  358 +Z,471
359 +Z,472  360 +Z,473  361 +Z,474  362 +Z,475  363 +Z,476
+Z,477  364 +Z,478  365 +Z,479  366 +Z,480  367 +Z,481  368 +Z,482
+Z,483  369 +Z,484  370 +Z,485  371 +Z,486  372 +Z,487  373 +Z,488
374 +Z,489  375 +Z,490  376 +Z,491  377 +Z,492  378 +Z,493
+Z,494  379 +Z,495  380 +Z,496  381 +Z,497  382 +Z,498  383 +Z,499
+Z,500  384 +Z,501  385 +Z,502  386 +Z,503  387 +Z,504  388 +Z,505
+Z,506  389 +Z,507  390 +Z,508  391 +Z,509  392 +Z,510  393 +Z,511
+Z,512  394 +Z,513  395 +Z,514  396 +Z,515  397 +Z,516
398 +Z,517  399 +Z,518  400 +Z,519  401 +Z,520  402 +Z,521
403 +Z,522  404 +Z,523  405 +Z,524  406 +Z,525  407 +Z,526
+Z,527  408 +Z,528  409 +Z,529  410 +Z,530  411 +Z,531
412 +Z,532  413 +Z,533  414 +Z,534  415 +Z,535  416 +Z,536
+Z,537  417 +Z,538  418 +Z,539  419 +Z,540  420 +Z,541
421 +Z,542  422 +Z,543  423 +Z,544  424 +Z,545  425 +Z,546
426 +Z,547  427 +Z,548  428 +Z,549  429 +Z,550  430 +Z,551
431 +Z,552  432 +Z,553  433 +Z,554  434 +Z,555  435 +Z,556
436 +Z,557  437 +Z,558  438 +Z,559  439 +Z,560  440 +Z,561  441 +Z,562
+Z,563  442 +Z,564  443 +Z,565  444 +Z,566  445 +Z,567  446 +Z,568
+Z,569  447 +Z,570  448 +Z,571 birthday +Z,572  449 +Z,573  450 +Z,574
451 +Z,575  452 +Z,576  453 +Z,577  454 +Z,578  455 +Z,579
456 +Z,580  457 +Z,581  458 +Z,582  459 +Z,583  460 +Z,584
461 +Z,585  462 +Z,586  463 +Z,587  464 +Z,588  465 +Z,589
+Z,590  466 +Z,591  467 +Z,592  468 +Z,593  469 +Z,594
470 +Z,595  471 +Z,596  472 +Z,597  473 +Z,598  474 +Z,599
475 +Z,600  476 +Z,601  477 +Z,602
```

Figure 3:
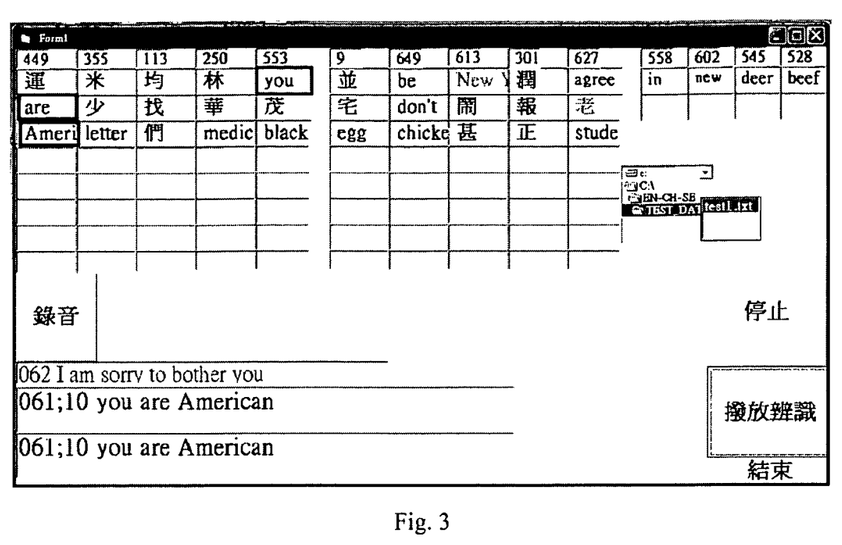
FIG. 3 shows the speech recognition for an English sentence "You are American"
Figure 4:
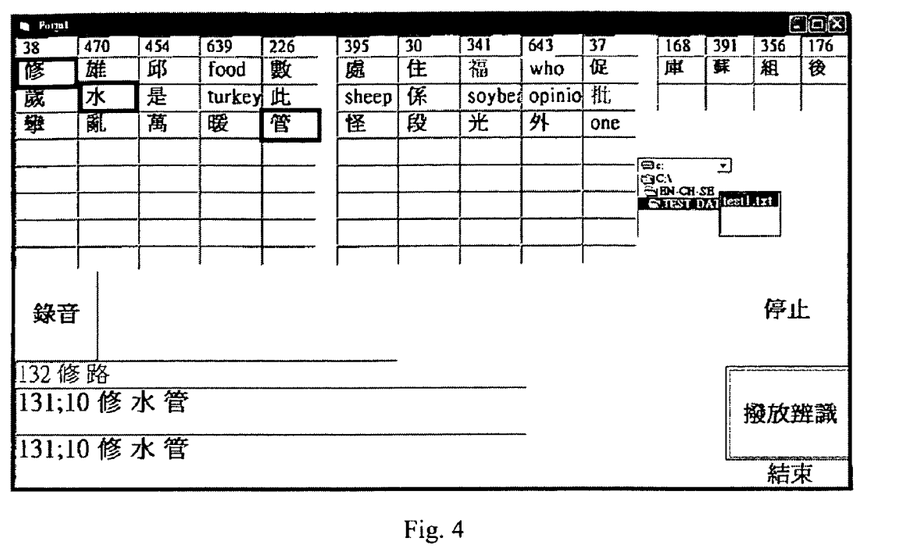
FIG. 4 shows the speech recognition for a Chinese sentence "Fix water pipe" in Chinese.

(v). two pictures in FIG. 3 and FIG. 4 from visual basic show the speech recognition on an English sentence and a Chinese sentence.

What is claimed is:

1. A speech recognition method for both English and Chinese provides both English word, sentence, name, and Chinese syllable, sentence, name recognition comprising:

(1). providing an English word and Chinese syllable database, a English and Chinese sentence and name database and deleting noise and the time interval without speech signal by using a processor;

(2). normalizing the whole speech waveform of a known English word (Chinese syllable) by using E=12 elastic frames without filter and without overlap and transforming the waveform into an E×P=12×12 matrix of linear predictive coding cepstra (LPCC) such that the same English words (Chinese syllables) have about the same LPCC at the same time position in their E×P=12×12 matrices of LPCC;

(3). wherein from all samples of each known English word (Chinese syllable), select its best K samples to compute the feature to represent the known English word (Chinese syllable);

(4). wherein the best K samples of a known English word (Chinese syllable) are used to compute the means and all samples of the known English word (Chinese syllable) are used to compute the variances of LPCC and the E×P=12×12 matrix of means and variances is called the standard pattern to represent the feature of the known English word (Chinese syllable) and is saved in the English word and Chinese syllable database;

(5). normalizing the whole waveform of an input unknown English word (Chinese syllable) by using E=12 elastic frames without filter and without overlap and transforming the waveform into an E×P=12×12 matrix of linear predict coding cepstra (LPCC), which is called the categorizing pattern to represent the unknown English word (Chinese syllable);

(6). wherein a simplified Bayesian decision classifier is used to match the standard pattern of every known English word (Chinese syllable) with the categorizing pattern of an input unknown English word (Chinese syllable) and to find a known English word (Chinese syllable) with the least Bayesian distance to be the unknown English word (Chinese syllable);

(7). modifying and improving the feature of an English word (Chinese syllable) such that the English word (Chinese syllable) is guaranteed to be recognized correctly, and creating the feature (standard pattern) of a new English word and a new Chinese syllable;

(8). partitioning an unknown English (Chinese) sentence or name into D unknown English words (D unknown Chinese syllables);

(9). wherein a simplified Bayesian classifier to find the F most similar known English words or Chinese syllables or both from the English word and Chinese syllable database for each of D unknown English words (Chinese syllables) and representing an unknown English (Chinese) sentence or name by using a D×F matrix of known similar English words or Chinese syllables or both;

(10). wherein the D×F matrix of similar known English words (Chinese syllables) is used to matches all known English (Chinese) sentences and names in the English and Chinese sentence and name database and find a known English (Chinese) sentence or name with the highest probability to be the unknown sentence or name;

(11). modifying and improving the feature of an unknown English word (Chinese syllable) in the input unknown English (Chinese) sentence or name such that the input unknown sentence or name is guaranteed to be recognized correctly; and (12). since the features of English words (without samples) are created from the features of Chinese syllables, performing speech recognition on other languages, such as German, French, Japanese, Korean, and Russian, wherein the features of said other languages can be created from the features of Chinese syllables to perform said speech recognition.

2. The speech recognition method for both English and Chinese as claimed in claim 1, wherein said step (1) further includes deleting noise by:

(a). computing the variance of sampled points in the time interval and deleting the time interval if the variance is less than the variance of noise; and (b). computing the total sum of distances between any two consecutive sampled points in a unit time interval and deleting the unit time interval if the total sum of distances is less than the total sum of noise.

3. The speech recognition method for both English and Chinese as claimed in claim 1, wherein said step (2) further includes normalizing signal waveform and extracting feature by:

(a). partitioning the whole waveform of a known English word (Chinese syllable) into E=12 equal sections and forming each section as an elastic frame without filter and without overlap such that E=12 equal elastic frames can contract and expand themselves to cover the whole waveform, not like Hamming window which has fixed length and filter;

(b). using a linear regression model in each elastic frame to estimate the nonlinear time-varying waveform to produce a set of P regression coefficients by the least squares method;

(c). using Durbin's recursive equations $$R(i) = \sum_{n=0}^{N-i} S(n)S(n+i), \, i \geq 0$$

$$E_0 = R(0)$$

$$k_i = \left[R(i) - \sum_{j=1}^{i-1} a_j^{(i-1)} R(i-j)\right] \Big/ E_{i-1}$$

$$a_i^{(i)} = k_i$$

$$a_j^{(i)} = a_j^{(i-1)} - k_i a_{i-j}^{(i-1)}, \, 1 \leq j \leq i-1$$

$$E_i = (1 - k_i^2) E_{i-1}$$

$$a_j = a_j^{(P)}, \, 1 \leq j \leq P$$

to compute the least squares estimates $a_j$, $1 \leq i \leq P$, which are called the linear predictive coding coefficient (LPC) vector and using the equations $$\hat{a}_i = a_i + \sum_{j=1}^{i-1} \left(\frac{j}{i}\right) a_{i-j} \hat{a}_j, \, 1 \leq i \leq P$$

$$\hat{a}_i = \sum_{j=i-P}^{i-1} \left(\frac{j}{i}\right) a_{i-j} \hat{a}_j, \, P < i$$

to transform LPC vector into the more stable linear predictive coding cepstra (LPCC) vector $\hat{a}_i$, $1 \leq i \leq P$; and (d). representing the feature of an English word (a Chinese syllable) by E=12 linear predictive coding cepstra (LPCC) vectors, i.e., an E×P=12×12 matrix of LPCC.

4. The speech recognition method for both English and Chinese as claimed in claim 1, wherein said step (3) further includes the selection of the K best samples for each known English word (Chinese syllable):

(a). uttering every known English word (Chinese syllable) once by a clear speaker with clear and distinct pronunciation;

(b). computing the Bayesian distances $l(x_i^k)$ between the known English word (Chinese syllable) $\omega_i$ denoted by the 12×12 matrix of LPCC $x = \{x_{jl}\}$, uttered by the clear speaker and every samples $x_i^k = \{x_{ijl}^k\}$ of word (syllable) $\omega_i$ in the sample database $$l(x_i^k) = \sum_{jl} \ln(\sigma_{ijl}) + \frac{1}{2} \sum_{jl} \left(\frac{x_{jl} - x_{ijl}^k}{\sigma_{ijl}}\right)^2$$

where $\sigma_{ijl}^2$ is replaced the sample variance computed from all samples $x_i^k = \{x_{ijl}^k\}$ of the known English word (Chinese syllable) $\omega_i$; and (c). finding the K best samples $x_1^k$ of the known English word (Chinese syllable) from all samples of English word (Chinese syllable) $\omega_i$, with the K least values $l(x_i^k)$.

5. The speech recognition method for both English and Chinese as claimed in claim 1, wherein said step further includes transforming the waveform of an unknown English word (Chinese syllable) into an E×P=12×12 matrix of LPCC:

(a). partitioning the whole waveform of the unknown English word (Chinese syllable) into E=12 equal sections and forming each section as an elastic frame without filter and without overlap;

(b). using a linear regression model in each elastic frame to estimate the nonlinear, time-varying waveform and producing P regression coefficients by the lease squares method;

(c). implementing the least squares method by using Durbin's recursive equations $$R(i) = \sum_{n=0}^{N-i} S(n)S(n+i), \, i \geq 0$$

$$E_0 = R(0)$$

$$k_i = \left[R(i) - \sum_{j=1}^{i-1} a_j^{(i-1)} R(i-j)\right] \Big/ E_{i-1}$$

$$a_i^{(i)} = k_i$$

$$a_j^{(i)} = a_j^{(i-1)} - k_i a_{i-j}^{(i-1)}, \, 1 \leq j \leq i-1$$

$$E_i = (1 - k_i^2) E_{i-1}$$

$$a_j = a_j^{(P)}, \, 1 \leq j \leq P$$

to compute the least squares estimate vector, called a (LPC vector) $a_j$, j=1, . . . , P;

(d). transforming the LPC vector into a more stable LPC cepstra (LPCC) vector $\hat{a}_i$, i=1, . . . ,P, by the equations $$\hat{a}_i = a_i + \sum_{j=1}^{i-1} \left(\frac{j}{i}\right) a_{i-j} \hat{a}_j, \ 1 \le i \le P$$

$$\hat{a}_i = \sum_{j=i-P}^{i-1} \left(\frac{j}{i}\right) a_{i-j} \hat{a}_j, \ P < i;$$

(e). calling the E×P=12×12 matrix of LPCC as the categorizing pattern to represent the feature of the unknown English word (Chinese syllable).

6. The speech recognition method for both English and Chinese as claimed in claim 1, wherein said step (6) includes providing a simplified Bayesian classifier to classify an unknown English word or a Chinese syllable:

(a). denoting a categorizing pattern of an unknown English word or Chinese syllable by using an E×P=12×12 matrix of LPCC, $X=\{X_{jl}\}$, j=1, ..., E, l=1, ..., P;

(b). assuming that E×P=12×12 $\{X_{jl}\}$ are independent and have normal distribution;

(c). denoting the means and variances of $\{X_{jl}\}$ by $(\mu_{ijl}, \sigma_{ijl}^2)$ which are estimated by the sample means made of the K best samples of $\omega_i$ and by the sample variances made of all samples of $\omega_i$, if the unknown English word or Chinese syllable $X=\{X_{jl}\}$ is compared with a known English word or a Chinese syllable $\omega_i$, i=1, ..., m;

(d). denoting the density of X by using $$f(x|\omega_i) = \left[\prod_{jl} \frac{1}{\sqrt{2\pi}\,\sigma_{ijl}}\right] e^{-\frac{1}{2}\sum_{jl}\left(\frac{x_{jl}-\mu_{ijl}}{\sigma_{ijl}}\right)^2}$$

where $X=\{X_{jl}\}$ is the E×P=12×12 matrix of LPCC of the categorizing pattern;

(e). matching the unknown English word or unknown Chinese syllable with all known English words and all Chinese syllables in the English word and Chinese syllable database by using a simplified Bayesian classifier;

(f). computing the similarity between a known word (syllable) $\omega_i$ and the unknown word (syllable) X by using the simplified Bayesian classifier with the density $f(x|\omega_i)$ $$f(x|\omega_i) = \left[\prod_{jl} \frac{1}{\sqrt{2\pi}\,\sigma_{ijl}}\right] e^{-\frac{1}{2}\sum_{jl}\left(\frac{x_{jl}-\mu_{ijl}}{\sigma_{ijl}}\right)^2}$$

(g). after taking the logarithmic value of $f(x|\omega_i)$ and deleting unnecessary constants, the similarity being measured by a Bayesian distance or a Bayesian classifier $$l(\omega_i) = \sum_{jl} \ln(\sigma_{ijl}) + \frac{1}{2} \sum_{jl} \left(\frac{x_{jl}-\mu_{ijl}}{\sigma_{ijl}}\right)^2$$

(h). computing the Bayesian distance $l(\omega_i)$ in (g) for each known English word or each known Chinese syllable $\omega_i$, i=1, ..., m;

(i). selecting a known English word or a known Chinese syllable $\omega_i$ by using the Bayesian classifier with the least $l(\omega_i)$ to be recognized as the unknown English word or the unknown Chinese syllable; and (j). giving the best recognition rates from the speech recognition experiments with 388 Chinese syllables, E=12, P=12 and K=4-8.

7. The speech recognition method for both English and Chinese as claimed in claim 1, wherein said step (7) further includes 3 skills to modify and improve the feature of an English word or a Chinese syllable such that the English word or the Chinese syllable is guaranteed to be recognized correctly, and to create the feature (standard pattern) of a new input English word or a Chinese syllable:

(a). calling an unknown English word or an unknown Chinese syllable or a new English word (Chinese syllable) as word (syllable) A if the unknown English word or Chinese syllable is not recognized correctly, or if a new word (syllable) is tested, and calling the top one known word (syllable) $\omega_i$ with the least $l(\omega_i)$ in 6(g) which is not the unknown word (syllable) (definitely not a new word or syllable) as word (syllable) B, the K best samples of word (syllable) A being not in the samples of word (syllable) A (the new word or syllable having no samples), and the K best samples of word (syllable) A being in the samples of word (syllable) B, use Bayesian distance $l(x_i^k)$ in 4(b) to find the K best sample of word (syllable) A from the samples $x_i^k=\{x_{ijl}^k\}$ of word (syllable) B to compute the means for word (syllable) A and to compute the variances for word (syllable) A from all samples of word (syllable) B so that the unknown word (syllable) A is guaranteed to be recognized correctly or the new means and variances can be the feature of the new English word or new Chinese syllable;

(b). using the Bayesian classifier in 6(g) to find top N similar English words or Chinese syllables or both in the English word and Chinese syllable database, which contains both English word standard patterns and Chinese syllable standard patterns, denoted by N matrices of means and variances $\{\mu_{ijl}, \sigma_{ijl}^2\}$, i=1, ..., N, with the N least Baysian distances to the unknown English word or Chinese syllable or the new English word or new Chinese syllable, finding the average (weighted average) of N matrices, $\mu_{jl} = \sum_{i=1}^{N} \mu_{ijl}/N$, $\sigma_{jl}^2 = \sum_{i=1}^{N} \sigma_{ijl}^2/N$, representing the average $\{\mu_{jl}, \sigma_{jl}^2\}$, j=1, ..., E, l=1, ..., P, to be a new feature (standard pattern) of the unknown English word or Chinese syllable or the new English word or new Chinese syllable; and (c). denoting the 12×12 matrix of LPCC of the unknown English word or Chinese syllable or a new English word or Chinese syllable uttered by the test speaker as $\mu_{jl}$ and denoting the average of the variances $\sigma_{ijl}^2$, i=1, ..., N, of the top N similar English words (Chinese syllables) in 7(b) as $\sigma_{jl}^2$, using $\{\mu_{jl}, \sigma_{jl}^2\}$, j=1, ..., E, l=1, ..., P, as the new feature of the unknown English word or Chinese syllable or the new English word or new Chinese syllable.

8. The speech recognition method for both English and Chinese as claimed in claim 1, wherein said step (8) further includes partitioning of an unknown sentence or name into D unknown English words or Chinese syllables:

(a). computing the total sum of absolute distances of two consecutive sampled points in a unit time interval and the unit time interval not containing any speech signal if the total sum of distances is less than the total sum of noise;

(b). if the unit time intervals without speech signal are cumulated to a certain amount (more than the time between two syllables in an English word), it having to be a border line between two unknown English words or Chinese syllables and partitioning an unknown sentence or name into D unknown English words or D unknown Chinese syllables on the border lines; and (c). normalizing the waveform of each of D unknown English words (Chinese syllables) by using E=12 elastic frames without filter and without overlap and in each frame, finding the least squares estimate vector (LPC vector) and linear predictive coding cepstra (LPCC), and representing an unknown sentence or name by using D E×P=12×12 matrices of LPCC which are D categorizing patterns.

9. The speech recognition method for both English and Chinese as claimed in claim 1, wherein said step (9) further includes:

(a). after an unknown sentence or name is partitioned into D unknown words (syllables), to each unknown word (syllable) $\{x_{jl}\}$, using the Bayesian distance by Bayesian classifier $$l(\omega_i) = \sum_{jl} \ln(\sigma_{ijl}) + \frac{1}{2} \sum_{jl} \left(\frac{x_{jl} - \mu_{ijl}}{\sigma_{ijl}}\right)^2, i = 1, \ldots, m$$

to find its F most similar known English words or Chinese syllables or both $\omega_i$, i=1, . . . , F denoted by $\{\mu_{ijl}, \sigma_{ijl}^2\}$, i=1, . . . , F, from the English word and Chinese syllable database and representing the unknown sentence or name by using D×F known similar English words or Chinese syllables or both; and (b). representing an unknown sentence or name by using a D×F matrix of similar known words or syllables or both and the D×F matrix of similar known words (syllables) containing the unknown sentence or name with high probability.

10. The speech recognition method for both English and Chinese as claimed in claim 1, wherein said step (10) further includes recognizing the unknown English or Chinese sentence or name:

(a). selecting the matching English or Chinese sentence or name with D−1, D and D+1 known English words or known Chinese syllables in the English and Chinese sentence and name database;

(b). if the matching known sentence or name just has D words or syllables, then comparing in row order, each of D rows of the F most similar known words (syllables) with each of known words (syllables) in the matching sentence or name;

(c). if each row of similar known words (syllables) contains a known word (syllable) in the matching sentence or name, then D unknown English words or D unknown Chinese syllables being recognized correctly and deciding the matching sentence or name to be the unknown sentence or name;

(d). if in (c), the number of correctly recognized words (syllables) is not D or if the matching sentence or name contains D−1 or D+1 known words (syllables), using 3×F window (3 consecutive rows of similar words (syllables)) to screen each known word (syllable) of the matching sentence or name, using the (i−1)-th, i-th, (i+1)-th rows of F similar known words or syllables to compare with the i-th known word or syllable in the matching sentence or name, using the first two rows of F similar words or syllables to compare with the first known word or syllable in the matching sentence or name, moving the 3×F screen window moves from the first to the last known word (syllable) in the matching sentence or name, and counting the number of the known words (syllables) of the matching sentence or name in the 3×F window; and (e). deciding the matching sentence or name with the highest probability (the number of known words (syllables) of the matching sentence or name in the 3×F window divided by the total number of words (syllables) in the matching sentence or name) to be the unknown sentence or name.

11. The speech recognition method for English and Chinese as claimed in claim 1, wherein said step (11) contains modifying and improving the feature of an English word (Chinese syllable) such that an unknown sentence or name is guaranteed to be recognized correctly:

(a). if an unknown sentence or name is not correctly recognized, then at least one unknown word (syllable) of the unknown sentence or name is not in its F most similar words and syllables; and (b). using one of 3 skills in said step (7) to improve or modify the feature of the unknown word (syllable) such that the unknown sentence or name is guaranteed to be recognized correctly.

\* \* \* \* \*